3,189,702
PACKAGE AND METHOD OF MAKING
Thomas H. Wall, St. Paul, and Allen D. Pearson, Mahtomedi, Minn., assignors to Minnesota Mining and Manufacturing Company, St. Paul, Minn., a corporation of Delaware
Filed Aug. 15, 1962, Ser. No. 218,212
7 Claims. (Cl. 206—63.2)

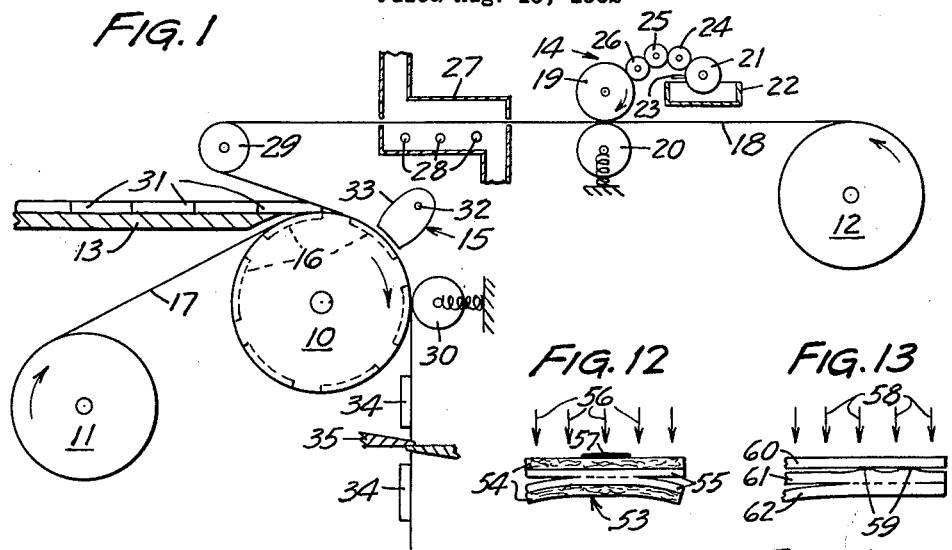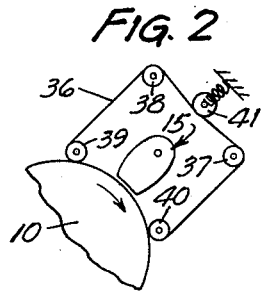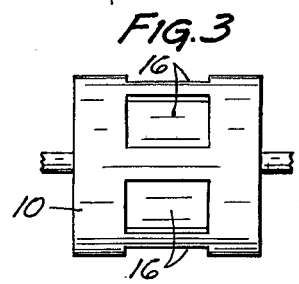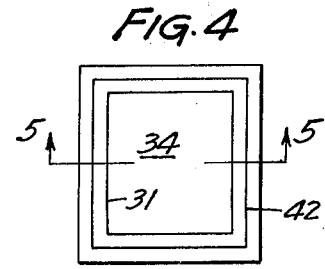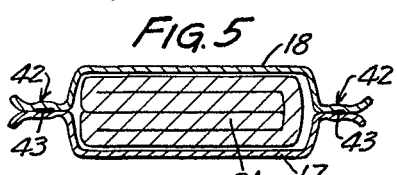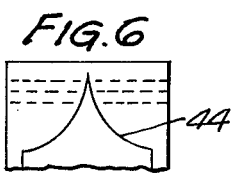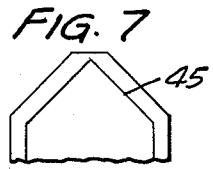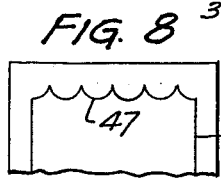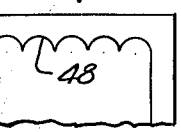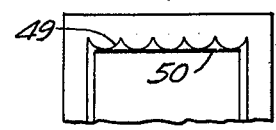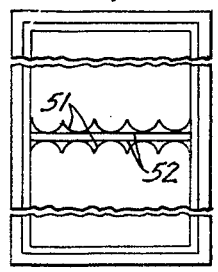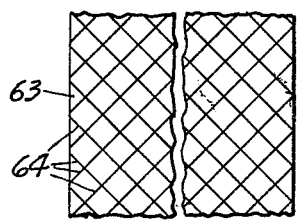

This application is a continuation-in-part of our application Serial No. 1,359 filed January 8, 1960, now abandoned. The invention relates to the making and sealing of packages, and has particular reference to readily openable hermetically sealed packages of sterile or aseptically clean contents encased between heat-sealable plastic films and to methods of making the same. The invention makes possible the sealing together of plastic films around pads, bandages and other items along seal lines which are of fully adequate strength to resist the disruptive forces involved in subjecting the sealed packages to sterilizing conditions and which at the same time are easily broken by hand pulling and without any tearing of the plastic film.

Heat sealing of packages, bags, or wrappings formed of heat-sealable plastic films may be accomplished through the application of heat and pressure by means of heated metal bars or plates. The metal surface may be pressed against the areas to be sealed and then pulled away without cooling, in which case difficulty is frequently encountered due to adhesion of the plastic to the metal, or to failure of the seal while the plastic is still warm and soft. To avoid such difficulty, the metal bar may be applied under pressure at the necessary activation temperature and then permitted to cool while still in pressure contact with the film surface; but the mass of the bar makes heating and cooling a slow and uneconomical procedure.

Methods such as "impulse" heating have also been developed. In these methods a thin foil or wire having low mass is held under pressure against the film areas to be sealed and is rapidly temporarily heated by an electrical pulse sufficient to fuse the film areas without retaining any appreciable quantity of heat at the area of the seal. The method requires complicated electrical and pressure-applying apparatus.

Another method of joining surfaces of heat-fusible materials involves heating internally at the splice area, i.e. by absorption of radiant energy in an absorptive layer placed between radiation-transmissive heat-fusible films, as described in Clowe et al. U.S. Patent No. 2,622,053. The absorptive layer may be itself heat-fusible, in which event the outer films fuse to the inner layer; or it may be of non-fusible material and provided with perforations through which heat-sealing of the outer films may be accomplished.

In the several foregoing methods the heat seals produced between the surfaces of the films are essentially permanent, having substantially the same strength as the remaining film areas. Packages produced by these methods are therefore permanently sealed, and must be opened either by cutting, or by tearing or rupturing the film material, or by some other destructive procedure.

It has now been found possible to provide hermetically sealed packages which, while being adequately sealed against any tendency to open under normal handling or during sterilization or like processing, may be readily opened along seal lines by simple hand stripping. Such packages have particular utility in the protection of sterile bandages and other medical and surgical supplies. Sterilization of the contents may be accomplished after the sealing operation has been completed, without danger of opening or weakening the seal. The package or envelope may subsequently be opened, as by the nurse or surgeon, by simple hand pulling without cutting or tearing of the protective film and therefore without the danger of contamination of the sterile or aseptically clean contents occasioned by contact with such cut or torn edges.

In accordance with the principles of the present invention, these advantageous results are obtained by internal or radiant energy heating under controlled conditions of time and intensity of radiation, with the adhering surfaces in pressure-contact, and employing strongly radiation-absorptive narrow lines of thermally non-adherent ink, all as hereinafter more specifically described.

In the drawing:
FIGURE 1 is a schematic representation in side elevation of apparatus suitable for continuously producing, filling and sealing packages in accordance with the invention;
FIGURE 2 similarly represents auxiliary apparatus which may be used with the apparatus of FIGURE 1;
FIGURE 3 is a plan view of the forming drum of FIGURE 1;
FIGURE 4 is a plan view of one form of completed package, and
FIGURE 5 is a section thereof, on a larger scale for clarity of illustration;
FIGURES 6–10 are partial plan views illustrating a number of different arrangements of openable seal areas along an external edge of a package;
FIGURE 11 illustrates a further seal configuration applied to a two-compartment package;
FIGURE 12 represents the sealing together of two two-layer laminates by a modified procedure;
FIGURE 13 similarly represents the sealing together of three layers of heat-sealable plastic film; and
FIGURE 14 represents a segment of a uniformly patterned heat-sealable plastic film useful in the practice of the invention.

The apparatus of FIGURE 1 consists essentially of a forming drum 10, film supply rolls 11 and 12, article supply shelf 13, printing assembly 14 and lamp 15, together with auxiliary equipment, not shown, for controlling and operating the mechanism.

The forming drum 10 provides surface depressions into which articles to be packed may fit. A resilient compressible drum cover, for example of sponge rubber or the like, provides the desired depressions through compression of the cover member and therefore is desirable for differently or irregularly shaped articles. On the other hand, the type of pre-formed drum surfane suggested in FIGURE 3 is fully satisfactory for articles of uniform and constant shape. Particularly when made of metal, the drum of FIGURE 3 provides a heat-conductive surface along the heat-seal areas and permits rapid dissipation of heat from the contacting surface of the heat-sealable film. The temperature of the surface layer of the film is thereby prevented from increasing to a point at which the film would be weakened or distorted. For this purpose the drum 10 may further be artificially cooled if desired, for example by an exterior air blast or by circulation of cooling fluid within the hollow interior.

In operation, the first film 17 from supply roll 11 is placed in contact with the surface of the drum 10 and overlying the depressions 16. A second film 18 from supply roll 12 is first printed at printing assembly 14 with a pattern in the form of the desired seal. The printing assembly consists essentially of a printing roll 19, pressure roll 20, inked roll 21 rotating in ink supply trough 22, scraper bar 23 or other means of removing excess ink from roll 21, and ink transfer rolls 24, 25 and 26.

Where necessary, the inked pattern on the film 18 is next dried or hardened, as in oven 27 fitted with suitable heating pipes or coils 28.

The film 18 is next passed around guide roll 29 and into contact with the upper surface of the film 17 on the drum 10. The two films are tautly held against the drum 10 by means of pressure roll 30, together with suitable braking means on supply rolls 11 and 12.

As the two films come together at the surface of the forming drum 10, the articles 31 which are to be packaged are periodically advanced between the films and in line with the depressions 16, the latter being indicated by dotted lines in the drawing. The tension in the upper film 18 is sufficient to force the article 31 into the depression 16 against the somewhat lesser tension in the lower film 17, and to bring the surfaces of the two films into close pressure contact at the areas just outside the depressions 16. The printed areas are so arranged as to provide a printed border within the thus formed pressure contact areas and around the entire periphery of each of the depressions 16. The film may additionally be printed, e.g. with designs, descriptive matter, or other indicia, at areas other than the border or heat-seal areas, with inks of various colors and which may or may not be absorptive of the radiation applied.

Radiation from lamp 15 is supplied at closely controlled high intensity to the composite as the drum 10 passes the lamp position. The lamp member consists of a coiled incandescent filament 32 or other source of intense radiation arranged at the inner focus of a truncated elliptical reflector 33, the external focus of which falls along a narrow line corresponding to a generatrix of the surface of the drum 10.

The radiation supplied from the lamp 15, and which is largely infra-red radiation, is absorbed within the inked areas, and the resulting heat pattern is of sufficient intensity to cause localized fusion and autogenous bonding of the two contacting plastic films only along narrow fusion bands contiguous to the edges of the ink lines, resulting in the formation of an effective hand-openable weld or seal capable of resisting sterilization conditions.

After the film, now in the form of a series of completely hermetically sealed packages containing the articles 31, passes the pressure roll 30, the composite is withdrawn from contact with the drum 10 and may then be wound up in roll form, or cut into individual packages 34, as by means of shears 35 indicated in the drawing.

In the apparatus just described, pressure between the two films is supplied by tension generated in the upper film 18 between the pressure roll 30 and the braking mechanism on supply roll 12. The pressure is particularly effective with multi-layer film or coated paper having a heat-sealable surface layer on a heat-resistant radiation-transmitting supporting web of high tensile strength. With thinner films, or films of less tensile strength or which consist solely of thermoplastic material, the necessary pressure is desirably supplied as indicated in FIGURE 2, by means of a separate transparent pressure belt 36, held in place by guide rolls 37–40 and under tension by idler roll 41. Radiation from the lamp 15 passes through the transparent belt 36 to be absorbed in the inked areas on the film 18 as before.

The radiation may alternatively be supplied from a source located within a transparent drum, e.g. a lamp 15 supported within a rotating glass cylinder replacing the drum 10, and with an elastic pressure belt in place of the belt 36 to permit passage of the articles 31.

The package 34 is shown in FIGURE 4 to be provided with a continuous straight-line seal 42 surrounding the article 31. As further shown in FIGURE 5, the seal 42 incorporates the inked line pattern 43, the outer edges of the films 17 and 18 being here shown in separated position. The package is hermetically sealed. The article 31 contained within the package, and which may for example be a sterile surgical dressing as illustrated, is completely protected. However the package is openable by hand pulling applied to the corner areas. The pointed corner of the seal area provides a region of stress concentration which, with the type of seal here provided, is sufficient to break the weld and permit the further linear disruption of the seal.

The package of which a portion is shown in FIGURE 6 is designed primarily to contain liquid contents. The ink line 44 provides a cusp-like projection, and the package may be opened by removal or separation of the end portion, e.g. by separating the sealed film segments by stress applied at the cusp, thereby providing an opening of any desired size through which the liquid contents of the package may be dispensed. The package of FIGURE 7 is similar but the inked line 45 is formed of straight rather than curved segments.

In FIGURES 8 and 9 the side seals 46 are formed along straight ink lines whereas the ink lines 47 and 48 of the respective end seals, although continuous, are arranged in a series of cusps. In FIGURE 10 a combination of cusped line 49 and straight line 50 is provided for the end seal, and the same is true of cusped lines 51 and straight lines 52 of the central seal of the package illustrated in FIGURE 11. The remaining seals of the packages of FIGURES 10 and 11 will be seen to be formed at two parallel ink lines. Various other specific forms and combinations of inked seal lines may be substituted for those here shown, the latter being merely illustrative. The cusped lines in each case provide seals having stress points at which an initial opening may be made. With continued application of stress, the seal opens longitudinally as the stress point progresses longitudinally thereof.

The form of seal shown in FIGURES 10 and 11 is particularly desirable for many purposes as combining the high bonding ability of a straight-line seal with the ability of a pointed or cusped seal to be opened under appropriate tension. Packages prepared with this and similar forms of seals have been found highly effective in retaining liquid or resinous contents even under considerable pressure during packing and handling, while still permitting easy opening and dispensing of contents without any necessity of cutting or tearing the film.

Polyethylene film is a preferred film material for use in the preparation of packages in accordance with the invention. Films of various thicknesses may be employed. A particular advantage in the case of heavier films is the retention of substantially all of the initial tensile strength of the film during the sealing operation. This effect is obtained due to the localized nature of the heating effect imparted by the absorption of the radiation only at the inked surface. With proper control of time and intensity of irradiation, and particularly in conjunction with heat-conductive supporting surfaces, it is found possible to restrict the heating substantially completely to the mutually contacting surface, thereby avoiding any significant heating and softening of the remaining thickness of the film. Wtih extremely thin and relatively fragile films the modification of apparatus shown in FIGURE 2 is useful. Although some heating may be noted at the outer surface of the film composite, the effect is not such as to prevent adequate sealing of the mutually contacting surface under the irradiation and the mechanical pressure provided.

Where desired, the available heat may be further conserved by providing the surface of the drum 10 with a heat insulating coating, such as a layer of silk screen or other reticulate fabric, and by employing silk screen or embossed heat-resistant plastic for the pressure belt 36. Since more of the film thickness is heated when employing such insulating means, it is frequently found preferable to omit the insulation and instead to employ a more intense source of radiation where higher temperatures are required.

Polyethylene films provide excellent heat sealability, are available in any desired thickness and surface configuration, may be colored or imprinted satisfactorily, provide excellent protective coverings of adequate strength, and may be both transmissive of infra-red and optically transparent. Polypropylene films are essentially equivalent to the polyethylene in all important aspects. The polyalkylene films are inexpensive and are preferred. For best results in making packages or envelopes of controlled openability the films should be non-oriented, although some moderate degree of orientation may be tolerated. The polyalkylene film may equally well be employed in the form of laminate or multi-layer structures in which a surface film of the polyalkylene is reinforced with one or more layers of paper or polyester film or other thin sheet or film material.

India ink, consisting essentially of carbon black in an aqueous solution of ammoniated casein, provides strongly infra-red-absorptive line patterns but must be applied with a draftsman's ruling pen. Inks prepared with other absorptive pigments and other binders are also useful; carbon black in vinyl resin binder and chrome green in nitrocellulose binder have been used. The ink may be applied as a suspension or solution in a volatile liquid vehicle, or as a fluid melt, or as an adherent powder or filament, or in other ways. Commercial printing inks which are strongly absorptive of infra-red radiation are readily available. A preferred practice involves the application of paste-like inks with ink-resistant raised rubber type or printing rollers in a continuous succession of separated continuous cusped ink lines or stripes.

The inks employed are sufficiently adherent to the film to remain in place prior to and during the step of irradiation, but do not fuse to, nor otherwise form a strong adherent bond between, the surfaces of the plastic film segments when thus irradiated. On the contrary, these thermally non-adherent inks serve to separate rather than unite the two plastic surfaces.

The ink line must be uniformly adequately dense to absorb the incident radiation and provide the required heat pattern; it must have essentially smooth edges; and the width of the line must be within the approximate limits of one to twenty times the thickness of the weaker of the two films. Much narrower lines, and in particular lines of less than about 5 mils in width when printed from rubber printing rollers, frequently are found to have irregular or rough edges, and seals made with such lines are undesirably weak. Much wider ink stripes are difficult to apply at uniform density, and seals made with such patterns lack uniformity. In addition, excessively wide stripes or lines detract from the appearance of the package, and in many cases result in such excessive heating as to cause severe weakening of the film.

It has now been found that, with proper control of the several factors involved, the two contacting heat-fusible films may be autogenously bonded together only along narrow fusion bands contiguous to the edges of the thermally non-adherent ink line, to provide seals capable of effectively resisting handling and sterilizing forces while still being easily openable by hand pulling.

The following example will serve further to illustrate the practice of the invention.

*Example*

For convenience in the continuous preparation of controllably openable sealed envelopes, the apparatus described in connection with FIGURES 1 and 2 was modified by placing the source of radiation within a "Pyrex" glass cylinder in place of the belt 36 of FIGURE 2, and using a soft rubber pressure roller in place of the forming drum 10. A current of air forced through the cylinder provide continuous cooling so that constant conditions could be maintained. A transparent polyethylene film and a pre-printed polyethylene film were brought into contact under pressure between the drum and cylinder. A thin protective paper web was also introduced between the printed film and the roller to protect the surface of the roller. Rotation of the glass cylinder carried the three webs together past the narrow band of intense radiation at the nip between the cylinder and roller at a constant rate of about 1.4 inches per second. Pressure between roller and cylinder was sufficient to compress the rubber roller to a contact area about ⅜ inch in width and was approximately 7 lbs. per square inch. The lamp used was rated at 290 volts 1350 watts and was operated at various input wattages.

The lower film was printed with a series of continuous cusped smooth-edged line patterns of radiation-absorptive black ink applied with a rubber printing roller having a raised line pattern, the width of the ink line being nominally 30 mils. Films of various thicknesses were used, the top (unprinted) and bottom (printed) film being of the same thickness in each instance.

Representative envelopes thus prepared were cut into appropriate strips and individually tested on the Instron tensile tester to determine the total force in pounds necessary to separate the two films lengthwise of the ink line, and the maximum force in pounds/inch necessary to separate the two films crosswise of the ink line. The width of the seal line along each edge of the ink line, at which the two films were autogenously bonded together, was also determined, by examination under a microscope equipped with a calibrated reticle and using polarized light for improved definition of the seal area.

Other envelopes, containing such items as absorbent pads and surgical tapes, were similarly prepared and tested under use conditions for resistance to sterilization procedures and for ability to be opened by simple hand pulling without tearing of the film. Sterilization involved (1) exposure to a vacuum of 24 inches of mercury for 20 minutes, (2) exposure to an atmosphere of 20% ethylene oxide in 80% carbon dioxide and at 40% relative humidity, 170° F. and 30 p.s.i. for 30 hours, and (3) exposure to a vacuum of 18 inches of mercury for 30 minutes. These packages were then inspected and tested for seam failure and openability, and the results compared with those obtained in the destructive tests on the seals made under identical conditions.

The results are shown in tabular form.

| Film | Watts | Seal | LW | CW | Quality |
|------|-------|------|-----|-----|---------|
| 1.5 | 720 | ---- | .01 | .4 | Failed. |
| 1.5 | 780 | 1.7 | .03 | .9 | OK. |
| 1.5 | 835 | 4.1 | .04 | 1.3 | Tore. |
| 1.5 | 920 | 5.0 | .09 | 1.5 | Do. |
| 1.5 | 1,000 | 5.2 | .16 | 1.3 | Tore badly. |
| 3.8 | 870 | 0.9 | .01 | .5 | Failed. |
| 3.8 | 1,020 | 4.6 | .07 | 2.2 | OK. |
| 3.8 | 1,180 | 7.0 | .17 | 3.3 | Tore. |
| 3.8 | 1,340 | 9.5 | .33 | 5.0 | Tore badly. |
| 3.8 | 1,400 | 11.8 | .57 | 5.5 | Do. |
| 5.5 | 1,250 | 2.6 | .02 | 1.3 | Failed. |
| 5.5 | 1,320 | 5.0 | .14 | 4.7 | OK. |
| 5.5 | 1,380 | 7.8 | .14 | 4.6 | OK. |
| 5.5 | 1,490 | 9.3 | .25 | 5.4 | Tore slightly. |
| 5.5 | 1,560 | 11.7 | .31 | 5.3 | Tore. |

In the table, "film" refers to the average caliper of the polyethylene films in mils. "Watts" refers to the measured watts input to the incandescent filament radiation source. "Seal" defines the average width in mils of each of the two narrow zones of autogenous bonding along opposite edges of the ink line; the two zones were ordinarily of essentially identical width. The heading "LW" refers to the total force in pounds required to open the seal by stripping the two films apart in a direction along the ink line, whereas "CW" indicates the maximum force in pounds required to separate a one-inch length of the seal in the direction across the ink line.

In these tests the width of the individual seal zones required to resist the stresses involved in the sterilization process while still being openable by hand pulling and without tearing of the film was from about one-half to about one and one-half times the thickness of the plastic film. Where the two films are not of equal thickness or strength, the same relationship applies but to the thinner or weaker of the two films involved. Significantly higher ratios are applicable in the case of reinforced films; for example, a seal zone having a width equal to two or even three times the thickness of a laminate of polyethylene and paper, or polyethylene and thin polyester film, may still provide a secure seal of controlled openability. In such cases it may be assumed that the reinforced laminate is equivalent to a proportionately thicker section of non-reinforced polyalkylene film.

The CW and LW values, and more particularly the ratio of these values, likewise provide a useful means for defining the controllably openable seals of the invention. For example, it may be determined from the foregoing tabulation that the fully effective seals described have a minimum ratio of CW to LW values of not less than about 15. However the width of seal, since it may be determined without destruction of the package, affords a more useful routine check value.

It will thus be apparent that the invention provides for the sealing together of plastic films at substantially less than the highest seal strength available but at a seal strength fully adequate to withstand sterilization techniques employing ethylene oxide and to maintain in aseptically clean or sterile condition the contents of plastic film envelopes or packages thus sealed and sterilized while still permitting opening of the envelope or package by hand pulling and without danger of contamination of the contents through contact with cut or torn film edges.

What is claimed is as follows:

1. A package of aseptically clean contents enclosed between a first thin plastic film and a second thin plastic film at least as thick as said first film, hermetically sealed together along a continuous seal area openable by hand pulling without tearing of either of said films, said seal area including a central narrow uniform smooth-edged stripe of strongly radiation-absorptive thermally non-adherent ink on a surface of one of said films and said surface being autogenously sealed to the adjacent surface of the other of said films only along narrow fusion bands contiguous to the edges of said ink stripe, the width of said ink stripe being about one to about twenty times the thickness of the said first film.

2. A package including a hermetically sealed protective plastic film envelope and adapted to undergo sterilization of the contents thereof by exposure to an atmosphere of ethylene oxide and under sub- and super-atmospheric pressures without seal failure while being easily openable by hand pulling without tearing of said film, said envelope consisting of two plastic film segments sealed together along a continuous seal area including a central narrow uniform smooth-edged stripe of strongly infra-red-absorptive thermally non-adherent ink on a surface of one of said film segments, said surface being autogenously sealed to the adjacent surface of the other of said film segments only along narrow fusion bands contiguous to the edges of said ink stripe.

3. A package including a hermetically sealed protective plastic film envelope, adapted to undergo exposure to sub- and super-atmospheric pressure as practiced in the ethylene oxide sterilization technique as herein described and without seal failure, while being easily openable along the seal area by simple hand pulling without tearing of said film, said envelope consisting of two thin polyalkylene film segments sealed together along a continuous seal area including a central narrow uniform smooth-edged stripe of strongly infra-red-absorptive thermally non-adherent ink on a surface of one of said film segments, the width of said stripe being about one to about twenty times the thickness of either of said two film segments, said surface being autogenously sealed to the adjacent surface of the other of said film segments only along narrow fusion bands contiguous to the edges of said ink stripe.

4. The method of making a plastic film envelope adapted to undergo exposure to sub- and super-atmospheric pressure in the ethylene oxide sterilization technique as herein described and without seal failure, while being easily openable along the seal area by simple hand pulling and without tearing of the film, said process comprising the steps of (1) imprinting on a surface of a first film segment a continuous narrow uniform cusped smooth-edged stripe pattern of strongly radiation-absorptive thermally non-adherent ink, (2) placing a second film segment over and in pressure-contact with said surface at least along and adjacent said stripe, and (3) irradiating said stripe through one of said segments at an intensity and for a time adequate to produce at said stripe a heating effect sufficient to cause the occurrence of autogenous bonding between said films only along narrow fusion bands contiguous to the edges of said ink stripe and of a width permitting longitudinal separation of said segments along said line by hand pulling without tearing of said segments; at least said one of said film segments being transmissive of said radiation.

5. The method of preparing a package of aseptically clean contents comprising the steps of (1) imprinting on a surface of a first thin plastic film segment a continuous narrow uniform cusped smooth-edged stripe pattern of strongly radiation-absorptive thermally non-adherent ink, (2) placing over said surface and within the outlines of said stripe pattern an article to be asceptically protected, (3) placing a second thin plastic film segment over said article and in pressure-contact with said surface at least along and adjacent said stripe, (4) irradiating said stripe through one of said film segments at an intensity and for a time adequate to provide at said ink stripe a heating effect sufficient to produce autogenous bonding between said segments only along narrow fusion bands contiguous to the edges of said ink stripe and of a width permitting longitudinal separation of said segments along said bands by hand pulling without tearing of said segments while being highly resistant to separation by forces applied in a direction across said bands, and (5) subjecting the thus sealed package to sterilization technique involving (a) evacuation, (b) exposure to moist ethylene oxide vapor at elevated temperature and superatmospheric pressure, and (c) evacuation.

6. A plastic film envelope structure comprising two superimposed heat-sealable plastic film segments sealed to each other along a seal area including a narrow uniform smooth-edged stripe of strongly infra-red-absorptive thermally non-adherent ink on an opposing surface of one of said film segments and wherein the opposing surfaces of said film segments are autogenously sealed to each other only along narrow fusion bands contiguous to the edges of said ink stripe.

7. A plastic film envelope structure comprising first and second superimposed thin heat-sealable plastic film segments, said second segment being at least as thick as said first segment, the opposing surfaces of said segments being autogenously bonded to each other along narrow parallel continuous seal lines each of width approximately equal to the thickness of said first segment; and a narrow uniform smooth-edged stripe of strongly infra-red-absorptive thermally non-adherent ink enclosed between said seal lines.

References Cited by the Examiner

UNITED STATES PATENTS 2,622,053 12/52 Clowe et al. _____ 161—115
2,959,280 11/60 Lloyd _____ 206—63.3
3,066,848 12/62 Billeb.

THERON E. CONDON, *Primary Examiner.*

EARLE J. DRUMMOND, *Examiner.*